United States Patent [19]
Liang et al.

[11] Patent Number: 4,475,959
[45] Date of Patent: Oct. 9, 1984

[54] NON-AQUEOUS BRAZING ALLOY PASTE

[75] Inventors: Anthony Liang, Belmont; Ronald W. Cox, Menlo Park, both of Calif.

[73] Assignee: GTE Products Corporation, Stamford, Conn.

[21] Appl. No.: 513,516

[22] Filed: Jul. 13, 1983

[51] Int. Cl.³ .............................................. B23K 35/34
[52] U.S. Cl. ......................................... 148/24; 148/25
[58] Field of Search ..................................... 148/23–25

[56] References Cited

U.S. PATENT DOCUMENTS 3,073,270  1/1963  Johnson ................................. 148/25
3,746,620  7/1973  Vance .................................... 148/23
4,273,593  6/1981  Mastrangelo ......................... 148/25

Primary Examiner—Peter D. Rosenberg
Attorney, Agent, or Firm—Donald R. Castle

[57] ABSTRACT

Organic vehicle systems are described which are used in brazing alloy pastes. A principal feature of the systems is used of non-aqueous solvents to avoid reactions with alloy constituents.

4 Claims, No Drawings

NON-AQUEOUS BRAZING ALLOY PASTE

FIELD OF THE INVENTION

This invention relates to brazing alloy pastes. More particular it relates to a non-aqueous brazing alloy paste.

BACKGROUND OF THE INVENTION

Brazing alloy pastes generally are formulated to contain from about 70% to about 90% by weight of the brazing alloy powder having particles that pass through a 150 mesh screen and retained on a 325 mesh screen. The remainder is a resinous vehicle which gives body or viscosity to the paste. The solvent for the resin can be either water or organic solvent. In use, the paste is applied to the joint to be brazed and the work-piece placed in a brazing furnace. Depending on the alloy and work-piece, the furnace can be operated under hydrogen or vacuum. Shelf-life of the pastes should be at least six months. In practice, however, the alloy powders sometimes react with the resin vehicle, or the vehicle itself breaks down. To a large extent these problems depend on the alloy composition. For example, alloys with a high proportion of noble metals generally give stable pastes, as do high-chrome alloys. Alloys which contain reactive elements have to be stabilized, normally by electroplating with a non-reactive metal or by coating with additives. The electroplating process contributes to the overall cost of the paste, while additives very often give a carbonaceous residue at brazing temperatures.

SUMMARY OF THE INVENTION

A non-aqueous stable brazing alloy paste is provided in one aspect of this invention. The paste of this invention consists essentially of from about 60% to about 95% by weight of a brazing alloy having an average particle size of from about 40 to about 120 microns and from about 5% to about 40% by weight of an organic vehicle. The organic vehicle contains specified amounts of certain resins dispersed in certain hydroxylic solvents to yield a paste having an extrudable gelantinous viscosity.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

The brazing alloys powders which are used in the practice of this invention have a particle size of from about 40 to about 120 microns thus generally are those which pass through a 150 mesh screen and are retained on a 325 mesh screen. While any precious metal brazing alloys such as those that contain Ag, Au or Pd, can be used in the practice of this invention, the invention is particular suited for those brazing alloys that contain a metal that reacts with the resinous materials which are generally used to form the pastes. Such alloys include the nickel base brazing alloys meeting the AMS 4777, 4778 and 4779 specifications. These alloys contain from 3.5 to 4.5% by weight of silicon, from 0 to 7% chromium, from 0 to 3% iron and the balance is nickel. In addition, brazing alloys which contain Ti, V or Zr tend to be reactive thus are suited for use in the practice of this invention. Precious metal base brazing alloys that contain up to 5% by weight of titanium, vanadium, zirconium or mixtures thereof can be used and a stable paste can be provided by the practice of this invention.

The preferred resins in the practice of this invention are the hydroxyalkyl cellulose resins such as are formed by the reaction of propylene oxide with alkali cellulose which have a molecular weight above about 500,000. A typical material is sold under the trademark KLUCEL by Hercules Incorporated, Wilmington, Del.

An additional type of resin which can be used in conjunction with the hydroxyalkyl celluose resins described above are the polyacrylic acid resins having a molecular weight above about 1 million. A typical resin suitable in the practice of the present invention is sold under the registered trademark, Carbopol, by B. F. Goodrich, Cleveland, Ohio.

The resins are dispersed in a hydroxylic solvent such as ethyl alcohol, methoxyethane, 1, 2 ethanediol, 1, 2, 3, propanetriol and mixtures thereof.

Suitable hydroxylic solvents are those that in conjunction with the suirable resins described herein and with the metal powders from a paste having an extrudable viscosity. The following test is employed gelatinous. to determine suitable hydroxylic solvents and defines an extrudable viscosity as used herein.

Step 1. 97 grams of the hydroxylic solvent is mixed with 1 gram of Carbopol 934 and 2 grams of KLUCEL H. Mixing is sufficient to provide a relatively uniform organic vehicle.

Step 2. The foregoing organic vehicle is mixed with ASTM 4778A alloy powder in a weight ratio of powder to vehicle of 17:3. Mixing is continued for a sufficient time to provide a relatively uniform paste.

Step 3. A syringe having a needle with a 0.046 inch inside diameter and a capacity of at least 30 cc is filled with the mixture from Step 2.

Step 4. A pressure of 20 pounds per square inch is applied to the plunger for 1 minute. If a paste has a suitable gelatinous viscosity from 21 to 25 grams of paste is extruded.

If the hydroxylic solvent forms too thin a gel more than 25 grams of the paste will be extruded. If the hydroxylic solvent forms too thick a gel less than 21 grams of the paste will be extruded.

The amount of the resin constitutes from about 0.5% to about 7% of the organic constituent of the paste. The remainder is the aforementioned organic solvents. When the polyacrylic acids are used they can be added from about 1% to about 5% by weight of the total organic vehicle. When hydroxyalkyl cellulose is used it can constitute from 0.2% by weight to about 5% by weight of the organic vehicle. The combination of the resins cannot exceed about 7% of the total organic or else the gel that is formed is too thick and hence is not extrudable as defined herein. Below about 0.5% of the resin results in a gel which is too thin and does not form an extrudable paste with the brazing alloys. In most instances the preferred total amount of resin is from about 2% by weight to about 4% by weight. It is also preferred to have a weight ratio of the hydroxyalkyl cellulose resin to the polyacrylic resin of about 2:1.

In order to more fully illustrate the subject invention the following detailed examples are presented. All parts proportions and percentages are by weight unless otherwise indicated.

EXAMPLES

Vehicles useful in the present invention are made by dispersing a polyacrylic acid such as Carbopol 934 in various hydroxylic organic solvents to make about a 2% solution. These are mixed with an equal portion by weight of about a 4% dispersion or a hydroxypropyl cellulose such as sold by Hercules Incorporated, Wilmington, Del. under the trademark KLUCEL H in the same solvent. The resulting mixture contained about 1% Carbopol 934 and 2% KLUCEL H.

TABLE 1
RESIN VEHICLES

| Example | Solvents | Remarks |
|---|---|---|
| 1 | Methyl Cellosolve (methoxyethanol) | Semigel, thick |
| 2 | Ethyl Alcohol (1, 2 ethanediol) | Semigel, thin |
| 3 | Ethylene Glycol | Clear gel, thick |
| 4 | n-Butyl Alcohol | Ropey gel. |
| 5 | Glycerol (1, 2, 3 propanetriol) | Thick gel. |
| 6 | n-Propyl Alcohol | No gel formation. (thin mixture) |
| 7 | 21% Ethylene Glycol 79% Methyl Cellosolve | Semi-gel. |
| 8 | 46% Methyl Cellosolve 54% Ethyl Alcohol | Semi-gel. |
| 9 | 54% Ethyl Alcohol 46% n-Butyl Alcohol | Semi-gel. |
| 10 | 21% Ethyl Alcohol 79% n-Butyl Alcohol | Semi-gel. |
| 11 | 21% Glycerol 79% Ethyl Alcohol | Semi-gel. |
| 12 | 21% Ethylene Glycol 79% Ethyl Alcohol | Semi-gel. |
| 13 | Water | Thick gel, clear. |

Brazing alloy pastes as shown in Table 2 are made with various vehicles and 85 parts of 4778A powder, (−150 mesh) and 15 parts of the above resin vehicle by weight.

TABLE 2
PASTE CHARACTERISTICS

| Example | Resin Vehicles | Remarks |
|---|---|---|
| A | 1% Carbopol 934 with sodium hydroxide. | Short shelf life. |
| B | 1 | Long shelf life, fast evaporating. |
| C | 2 | Long shelf life, evaporating. |
| E | 4 | Poor paste properties. |
| F | 7 | Long shelf life, paste dries to soft consistency. |
| G | 8 | Long shelf life, fast evaporating. |
| H | 9 | Paste slightly ropey, but still usable. |
| I | 10 | Paste turned rubbery after one week. |
| J | 11 | Long shelf life, dries to slightly soft consistency. |
| K | 12 | Long shelf life, dries slightly soft consistency. |
| L | 13 | Paste has air bubbles, discolors after one week. Thick. |

Pastes examples B, C, F, G, J, K have good application properties and shelf life, and give good clean brazed joints in vacuum and hydrogen. Pastes Examples G, J and K were compared against Example A for evaporation rate. About 4 grams of each paste is spread on an aluminum weighing pan and weight loss is determined at different times at room conditions (about 21° C. and 50% relative humidity). The results are shown in Table 3.

TABLE 3
% WEIGHT LOSS

| Time (minutes) | Paste A | Paste G | Paste J | Paste K |
|---|---|---|---|---|
| 10 | 4 | 4.2 | 3.5 | 4.5 |
| 60 | 7 | 8.0 | 5.0 | 7.8 |
| 120 | 8.2 | 10.2 | 6.8 | 9.0 |
| 180 | 9.0 | 11.8 | 8.0 | 9.2 |
| 240 | 9.0 | 12.0 | 8.2 | 9.2 |
| 300 | 9.0 | 13.0 | 9.1 | 9.2 |

As can be seen in Table 3, evaporation rate can be controlled by choice of solvent combinations.

Carbopol 941 can be used in place of Carbopol 934 if a slightly thicker paste is desired. Substitution is made on an equal part basis. Use of substantially more Carbopol than the amount as disclosed herein may give sooty residues on brazed joints. The Carbopol resin can be completely eliminated and Klucel H substituted instead, but its combination with Klucel gives the resulting vehicle a certain gel-like consistency or "puffiness", even though no base neutralization is involved. If Klucel is eliminated from the combination and the Carbopol (dispersed in an organic solvent) neutralized with an organic base, a stiff gel results and AMS 4778A pastes made with such gels give poor brazed joints or leave unacceptable amounts of carbon.

While there has been shown and described what are at present considered the preferred embodiments of the invention, it will be obvious to those skilled in the art that various changes and modifications may be made therein without departing from the scope of the invention as defined by the appended claims.

What is claimed is:

1. A non-aqueous brazing alloy paste consisting essentially of from about 60% by weight to about 95% by weight of a brazing alloy having particle size of from about 40 to about 120 microns and from about 5% to about 40% by weight of an organic vehicle consisting essentially of from 1 to about 5% by weight of a polyacrylic acid resin, from about 0.2% to about 5% by weight of a hydroxycellulose resin and from about 93.0% by weight to about 99.5% by weight of a hydroxylic solvent, wherein said paste has a gelatinous extrudable viscosity.

2. A paste according to claim 1 wherein said hydroxylic solvent is selected from the group consisting of ethyl alcohol, methoxyethanol, 1, 2 ethanediol, 1, 2, 3 propanetriol and mixtures thereof.

3. A paste according to claim 2 wherein said polyacrylic resin has a molecular weight above about 1 million.

4. A paste according to claim 3 wherein the weight ratio of hydroxylic cellulose resin to the polyacrylic resin is about 2:1.

* * * * *